United States Patent
Suzuki et al.

[11] Patent Number: 5,901,672
[45] Date of Patent: May 11, 1999

[54] VEHICLE ENGINE COMPARTMENT STRUCTURE AND METHOD FOR INTRODUCING COOL INTAKE AIR

[75] Inventors: Makoto Suzuki; Shizuo Abe, both of Mishima, Japan

[73] Assignee: Toyota Jidosha Kabushiki Kaisha, Toyota, Japan

[21] Appl. No.: 08/917,810

[22] Filed: Aug. 27, 1997

Related U.S. Application Data

[63] Continuation of application No. 08/690,083, Jul. 31, 1996, abandoned.

[30] Foreign Application Priority Data

Sep. 29, 1995 [JP] Japan ..................................... 7-253212

[51] Int. Cl.⁶ ........................................................ F01P 7/10
[52] U.S. Cl. ........................................ 123/41.49; 180/68.1
[58] Field of Search ............................... 123/41.12, 41.49; 415/60, 61, 62; 180/68.1

[56] References Cited

U.S. PATENT DOCUMENTS

| | | | |
|---|---|---|---|
| 4,186,693 | 2/1980 | Thien et al. | 123/41.12 |
| 4,516,650 | 5/1985 | Yamaguchi et al. | 180/68.3 |
| 4,610,326 | 9/1986 | Kirchweger et al. | 180/68.1 |
| 5,143,516 | 9/1992 | Christensen | 180/68.1 |
| 5,522,457 | 6/1996 | Lenz | 123/41.49 |

FOREIGN PATENT DOCUMENTS

| | | |
|---|---|---|
| 259 182-A2 | 3/1988 | European Pat. Off. . |
| 41 23 038-A1 | 8/1992 | Germany . |
| 43 24 071-A1 | 1/1995 | Germany . |
| 59-211714 | 11/1984 | Japan . |
| 61-250373 | 11/1986 | Japan . |
| 2259227 | 10/1990 | Japan ................................. 123/41.49 |
| 3-108821 | 11/1991 | Japan . |
| A-5-1634 | 1/1993 | Japan . |
| A-5-155256 | 6/1993 | Japan . |
| 6-27271 | 4/1994 | Japan . |

OTHER PUBLICATIONS

Shizuo Abe et al., *SAE Paper No. 9535314*, Three Dimensional Numerical Analysis of Engine Compartment Flow, pp. 223–226 May 1995.

*Primary Examiner*—Noah P. Kamen
*Attorney, Agent, or Firm*—Oliff & Berridge, PLC

[57] ABSTRACT

An engine compartment structure for introducing cool air into an air intake port without providing a baffle plate is constructed such that air discharged by cooling fans is directed away from the air intake port. A rotational direction of a second cooling fan of a pair of cooling fans can be opposite to the first cooling fan. The first cooling fan is closer to the air intake port than the second cooling fan. Air volume discharged by the first cooling fan can also be larger than that of the second cooling fan. Furthermore, rotational directions of the pair of cooling fans can be selected such that the air discharged by the cooling fans is directed toward a space at the rear side of the opposite headlamp, and each air volume discharged by the respective cooling fan set differently.

14 Claims, 10 Drawing Sheets

$N2 = N1$
$L2 = L1$ $N2 < N1$
$L2 = L1$

N2 = N1
L2 < L1

N2 < N1
L2 = L1

N2 > N1
L2 = L1

N2 = N1
L2 < L1

N2 = N1
L2 > L1

N2 = N1
L2 = L1

VEHICLE ENGINE COMPARTMENT STRUCTURE AND METHOD FOR INTRODUCING COOL INTAKE AIR

This is a continuation of application Ser. No. 08/690,083 filed Jul. 31, 1996 now abandoned.

BACKGROUND OF THE INVENTION

1. Field of Invention

The present invention relates to an engine compartment structure of a vehicle for introducing cool air into an intake air system of the engine.

2. Description of the Related Art

Recently, supply of a large amount of air to engine combustion chambers for higher power performance is required from automotive engines. However, intake air in an engine is heated in the engine compartment and the temperature of the air rises before the air is sucked into the combustion chambers. When the temperature of the intake air introduced into the chambers rises, the air density is reduced, the weight of the intake air is reduced, and the air filling efficiency of the chambers is also reduced. Thus, the engine power is reduced and engine knocking occurs.

FIG. 12 is a schematic diagram showing a conventional engine compartment structure of a vehicle for introducing cool air into an intake air system of the engine. In FIG. 12, an air intake port 2 of a combustion engine 1 is located behind a first headlamp 3 in the engine compartment. A pair of cooling fans 5 and 5a are mounted on a rear side of a radiator 4 at substantially the same height, and the cooling fans rotate counterclockwise, as seen from the engine side. The cooling fans 5 and 5a shown at the bottom of FIG. 12 are depicted as if they were viewed through a radiator 4 when they were seen from the front of a vehicle, and arrows indicate rotational directions of the cooling fans 5 and 5a mounted on the radiator 4, for ease of understanding. The number of revolutions per minute and the blade length for each of the cooling fans 5 and 5a are the same. The intake air flowing into the air intake port 2 is sucked into combustion chambers of the engine 1 via an intake duct 6, an air cleaner 7, an intake pipe 8, a surge tank 9 and an intake manifold 10, in that order. A transmission 11 is provided on the right side of the engine 1 as seen from the front of the vehicle. Above the transmission 11, there is a space, as the height of the transmission 11 is lower than that of the engine block 1. The radiator 4 is covered with an under cover 12. Fresh air FA flows into the engine compartment from outside after passing through a space behind a second headlamp 3a located opposite to the first headlamp 3 and the air intake port. However, after passing through the radiator cooling fans 5 and 5a heated air HA turns around toward the air intake port 2, and raises the temperature of the intake air. This results in reduced air filling efficiency in the combustion chambers of the engine.

In order to solve the above problem, a structure that restricts temperature increases of air introduced into an intake air system of an engine is disclosed in Japanese Unexamined Patent Publication No. 5-1634. According to the invention, the temperature of the air introduced into the intake air system from outside via an air intake port and an intake duct decreases, so that the air filling efficiency to the combustion chambers of the engine can be improved. To accomplish this, a baffle plate is provided in the structure in such a way as to extend a fan shroud of a radiator toward the rear of a car body and to intentionally open the air intake port of the intake duct toward the opposite side of the radiator, thereby preventing heated back wind passing through the radiator cooling fans from being introduced into the intake air system of the engine.

However, according to the invention disclosed in Japanese Unexamined Patent Publication No. 5-1634, a baffle plate must be provided. Therefore, additional expense for the baffle plate and for the man hours for assembling the baffle plate are required.

SUMMARY OF THE INVENTION

The present invention has been made in view of the foregoing problems. An object of the present invention is to provide an engine compartment structure for a vehicle for introducing cool air into an intake air system of an engine. The engine compartment structure prevents heated back wind passing through one or more radiator cooling fans from being introduced into the intake air system of the engine without requiring a baffle plate.

In order to accomplish the above object of the present invention, according to a first aspect of the present invention an air intake port is located behind a first headlamp in the engine compartment. An opening of the air intake port is arranged in front of the compartment, and a rotational direction of a first cooling fan of a pair of cooling fans mounted on a rear side of a radiator at substantially the same height is determined such that the air discharged by the first cooling fan is directed away from the location of the air intake port of the engine. A rotational direction of the second cooling fan of the pair of the cooling fans is opposite to the direction of the first cooling fan, and the first cooling fan is closer to the air intake port than the second cooling fan.

The air discharged by a pair of conventional cooling fans is generally deflected in the rotational direction of the cooling fans because the rotational direction of the cooling fans is the same. However, the rotational direction of the cooling fans according to the first aspect of the present invention are different each other, so that a rotational component of one of the cooling fans cancels the rotational component of the second cooling fan, and vice versa. As a result, the air discharged by the cooling fans is not deflected to a right or left side of the engine compartment when the compartment is viewed from the front of the vehicle, and does not turn around toward the air intake port of the engine. Thus, outside fresh air introduction into the air intake port can be accelerated.

According to the first aspect of the present invention, the air volume discharged by the first cooling fan in the pair of the cooling fans, which is mounted closer to the air intake port than the second cooling fan, is larger than that of the second cooling fan.

The air volume is set, for example, by changing the number of revolutions per minute or the size of the blades for the cooling fans. Even if the rotational speeds of the cooling fans are different from each other, the back wind of the cooling fans is not deflected toward the air intake port arranged in the rear side of one of the headlamps in the engine compartment, but is slightly deflected toward the opposite side of the intake air port, namely, toward a space at the rear of the other headlamp.

Furthermore, the effect of the first cooling fan mounted on the radiator closer to the air intake port arranged behind a first headlamp in the engine compartment on the back wind of the pair of the cooling fans is larger than that of the second cooling fan mounted on the radiator in the opposite side of the air intake port. Therefore, the air volume discharged by the first cooling fan becomes larger than that discharged by the second cooling fan, and the back wind of the radiator cooling fans as a whole is deflected to the opposite side of the air intake port, namely, the back wind is deflected toward the space in the rear side of the second head lamp in the engine compartment.

The second aspect of the present invention is characterized in that an air intake port is located behind a first headlamp in the engine compartment. An opening of the air intake port is arranged in front of the compartment, and rotational directions of a pair of cooling fans mounted on a rear side of a radiator at substantially the same height are determined such that the air discharged by the cooling fans is directed toward the rear side of the other headlamp, and each air volume discharged by the respective cooling fan is different.

The air volume is set, for example, by changing the rotational speeds or the size of the blades for the cooling fans. The air volume discharged by the first cooling fan, which is closer than the second cooling fan to the air intake port arranged in the rear side of the first headlamp in the engine compartment, may be larger or smaller than that of the second cooling fan. Furthermore, since both rotational directions of the pair of cooling fans are selected so that the back wind of the cooling fans is not deflected toward the air intake port, even if the air volumes discharged by the cooling fans are equal, the back wind of the cooling fans is deflected toward the opposite side of the air intake port, namely, toward a space in the rear side of the other headlamp. Thus, the heated air does not turn around towards the air intake port. When the air volume discharged by the cooling fans is different from each other interference between the back winds of the cooling fans can be reduced. The back wind of the cooling fans can also be deflected more, the noise generated by the cooling fans can be reduced, and fresh air from the outside can be insured.

BRIEF DESCRIPTION OF THE DRAWINGS

The present invention will be more clearly understood from the description as set forth below with reference to the accompanying drawings, wherein.

DETAILED DESCRIPTION OF PREFERRED EMBODIMENTS

Figure 1:
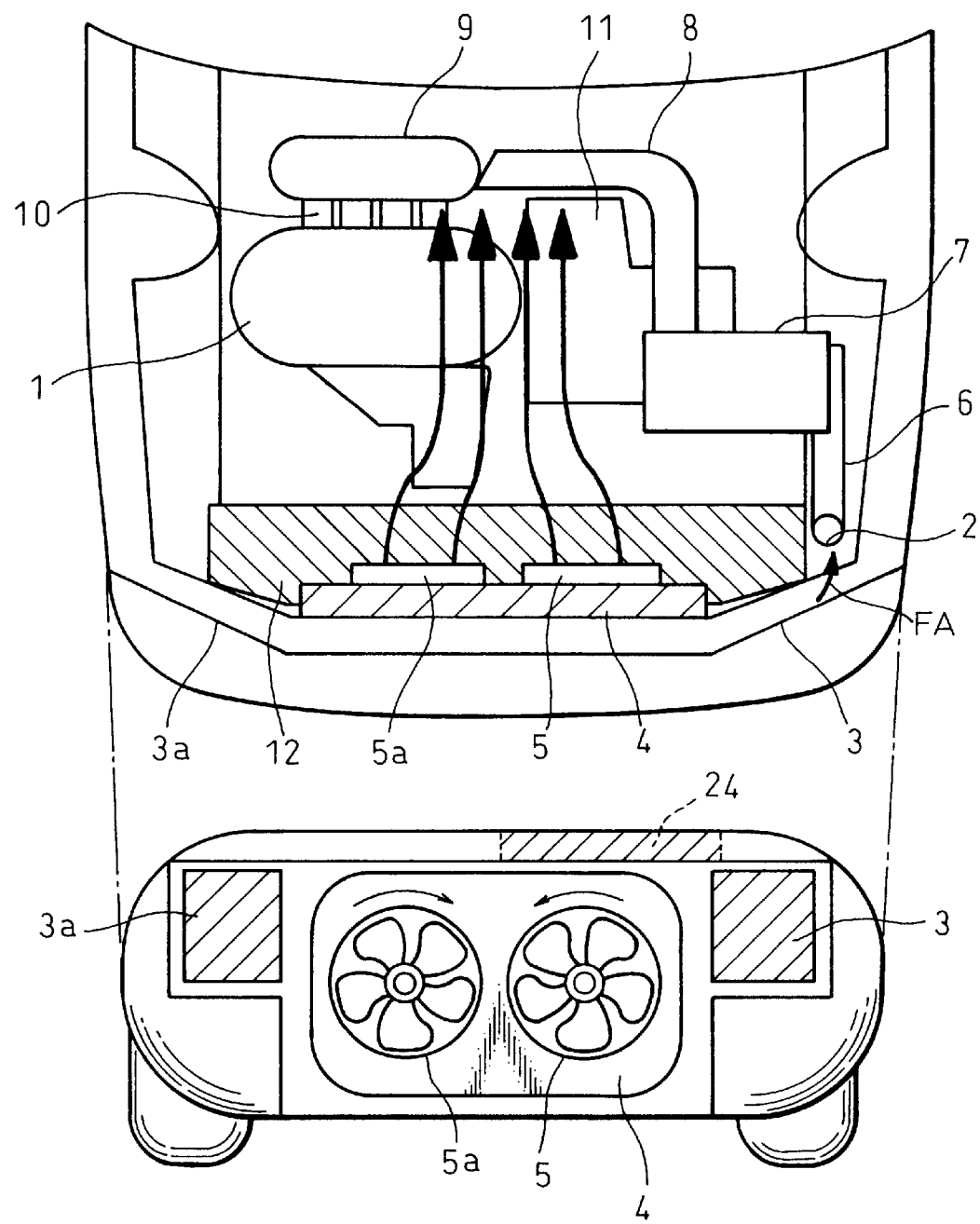
FIG. 1 is a schematic diagram showing an engine compartment structure of a vehicle for introducing cool air into an intake air system of the engine according to a first embodiment of the present invention.

In all the figures, from FIG. 1 to FIG. 12, the same reference numerals denote the same parts. FIG. 1 is a schematic diagram showing an engine compartment structure of a vehicle for introducing cool air into an intake air system of the engine according to a first embodiment of the present invention. The engine compartment structure shown in FIG. 1 is substantially the same as that shown in FIG. 12 except that the rotational direction of the cooling fan 5 for the radiator 4 is clockwise, while the rotational direction of the cooling fan 5a is counterclockwise, as seen from the engine side, and that the shape of the blades for the cooling fans 5 and 5a are made to suit the rotational direction of the cooling fans 5 and 5a. The engine compartment structure shown in FIG. 1 is the same as that shown in FIG. 12 in that rotational speeds and blade lengths for the cooling fans 5 and 5a are same. The cooling fans 5 and 5a are depicted in the lower part of FIG. 1, as if they were viewed through a radiator 4 and from the front of a vehicle. Arrows indicate rotational directions of the cooling fans 5 and 5a mounted on the radiator 4. The height of the first cooling fan 5 is approximately the same as the height of the second cooling fan 5a, such that any difference does not affect the flow of the air discharged by the first cooling fan 5. The same applies to the second to seventh embodiments. Hereinafter, the detail of the structure around the air intake port will be explained.

Figure 2:
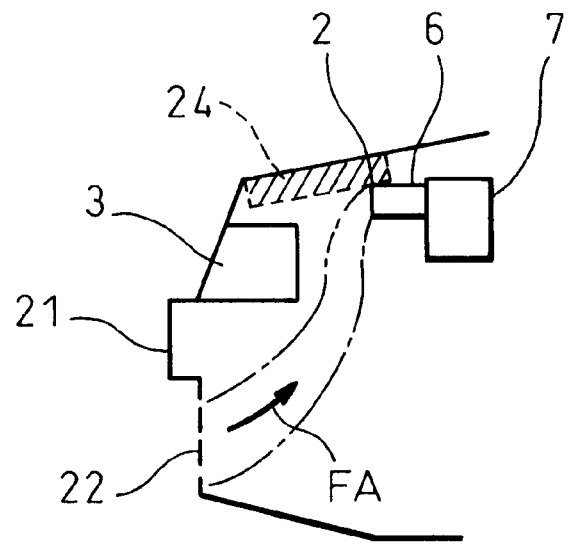
FIG. 2 is a right side view showing an air intake port shown in FIG. 1.
Figure 3:
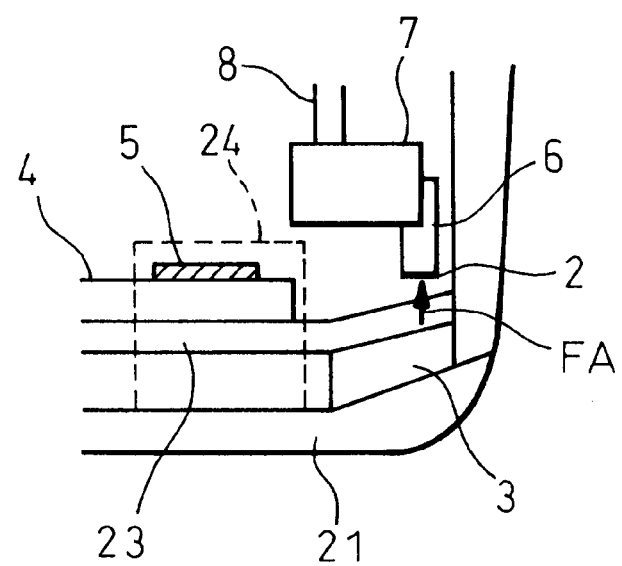
FIG. 3 is a plan view showing an air intake port as shown in FIG. 1.

FIG. 2 is a right side view and FIG. 3 is a plan view, each showing an air intake port shown in FIG. 1. As shown in FIG. 1, the air intake port 2 of the engine 1 is located behind a first headlamp 3 in the engine compartment. Namely, the air intake port 2 is located behind the headlamp 3 that is on the left side when the headlamp 3 is seen from the engine side. The opening of the air intake port 2 is directed toward the front side of the engine compartment. The intake air flowing into the air intake port 2 is introduced into the engine combustion chamber through an intake air duct 6, an air cleaner 7, an intake pipe 8, a surge tank and an intake manifold 10, in that order. In an embodiment of an engine compartment structure of a vehicle for introducing cool air into an intake air system of the engine according to the present invention, fresh air FA flowing into the engine compartment comes into the compartment through openings 22 underneath a bumper 21 under the headlamp 3 and enters into the air intake port 2 located behind the headlamp 3. The air intake port 2 is arranged at a lower position than the height of a radiator support 23 which supports the radiator 4. Heated air passing through the cooling fans 5 and 5a for the radiator 4 does not turn around into the air intake port 2, even if the engine is idling or operating at low speed. Thus, a temperature rise in the intake air can be avoided. The reason for this will be explained in detail later.

Furthermore, the fresh air FA introduced into the engine compartment flows through openings 22 as well as through other openings 24 arranged between the radiator support 23 for carrying the radiator 4 and a bonnet above the cooling fan 5, and cools the engine block 1 and the transmission 11. The heated back wind passing through the radiator 4 and being discharged by the cooling fans 5 and 5a neither turns around the air intake port 2 nor flows back toward the openings 24 when the vehicle is idling or operating at low speed. Thus the back wind does not turn around the front of the radiator 4. This enables effective cooling of the air intake system of the engine. As the fresh air FA flows around the air intake port 2 through the openings 24, the temperature around the air intake port 2 is reduced and the air pressure around the air intake port 2 does not become lower than that in the air intake system of the engine. Therefore, air back flow from the air intake system of the engine can be avoided without use of, for example, a check valve upstream of the intake duct 6, which is made, for example, of a rubber plate or the like.

Furthermore, the air intake port 2 is located behind the headlamp 3, and an opening of the air intake port 2 is located in front of the compartment. Accordingly, water and snow are prevented from entering the air intake port 2 due to the headlamp 3. Hereinafter, the details of the effect of back wind from the cooling fans for a radiator on streams of the air in the engine compartment will be explained. First, the axial component of wind velocity behind the fan blades as a unit will be explained.

Figure 4:
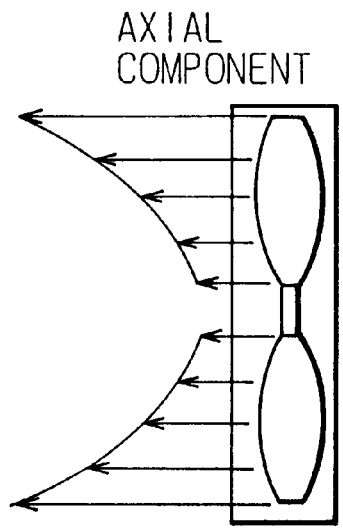
FIG. 4 is an explanatory view showing the axial component of the flow velocity behind the fan blades.
Figure 5:
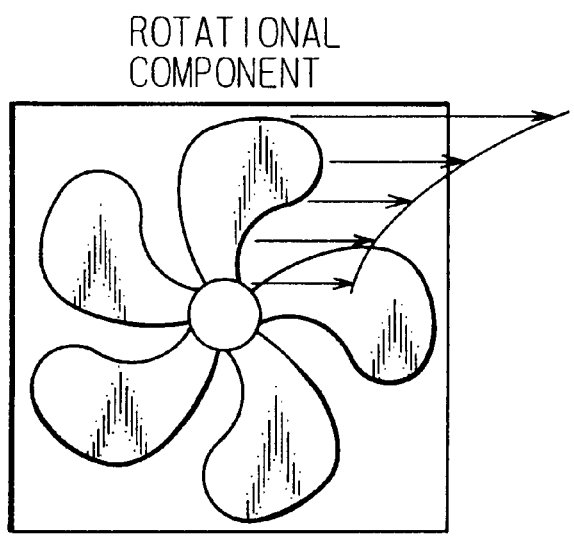
FIG. 5 is an explanatory view showing the rotational component of the flow velocity behind the fan blades.

FIG. 4 is an explanatory view showing the axial component of flow velocity behind the fan blades, and FIG. 5 is an explanatory view showing the rotational component of flow velocity behind the fan blades.

According to experimental results, the axial component of the flow velocity behind the fan blades is proportional to the distance r from the center of the rotational axis as exemplified by arrows shown in FIG. 4. The rotational component of flow velocity behind the fan blades is also proportional to the distance from the center of the rotational axis as exemplified by arrows shown in FIG. 5.

In light of the above experimental results, the analysis of air flow in an engine compartment of a vehicle by means of computer simulation was carried out. The experimentation took into consideration the effect of the axial component as well as the rotational component of fan velocity behind the fan blades on streams of the back wind of the cooling fans. Only the effect of the axial component of fan velocity behind the fan blades has conventionally been taken into consideration. Hereinafter, the results of this analysis will be explained referring to FIGS. 1 and 6 to 12. In the lower portions of FIGS. 1 and 6 to 12, the cooling fans 5 and 5*a* and rotational directions thereof are shown as viewed through a radiator 4 from the front of a vehicle. In FIGS. 1 and 6 to 12, a plurality of arrows depicted by thick lines show the air flow in the upper space of an engine compartment of a vehicle for introducing cool air into an intake air system of the engine according to the present invention as determined by the computer simulation when both the axial component and the rotational component of the flow velocity behind the fan blades of cooling fans for a radiator are taken into consideration.

Figure 11:
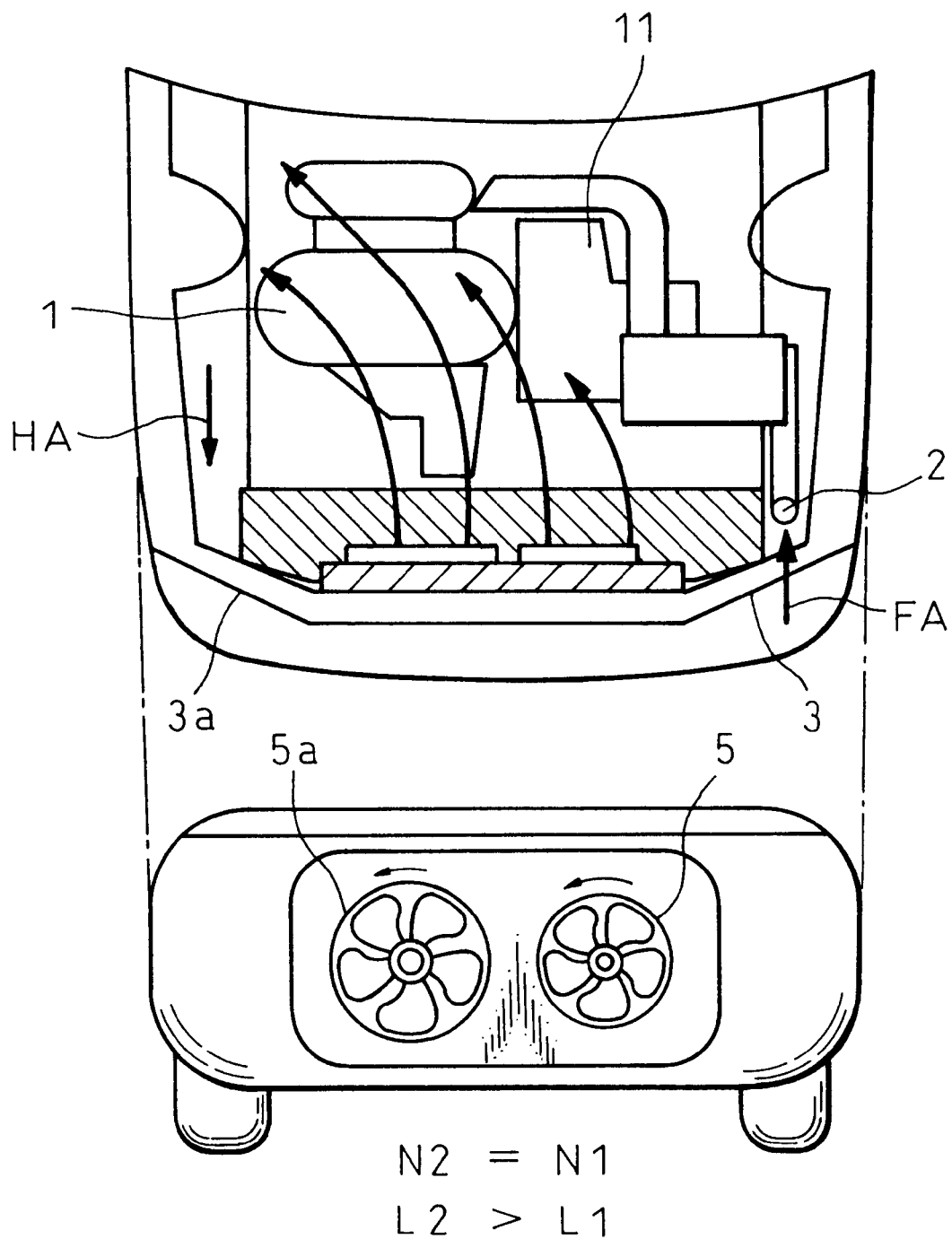
Figure 12:
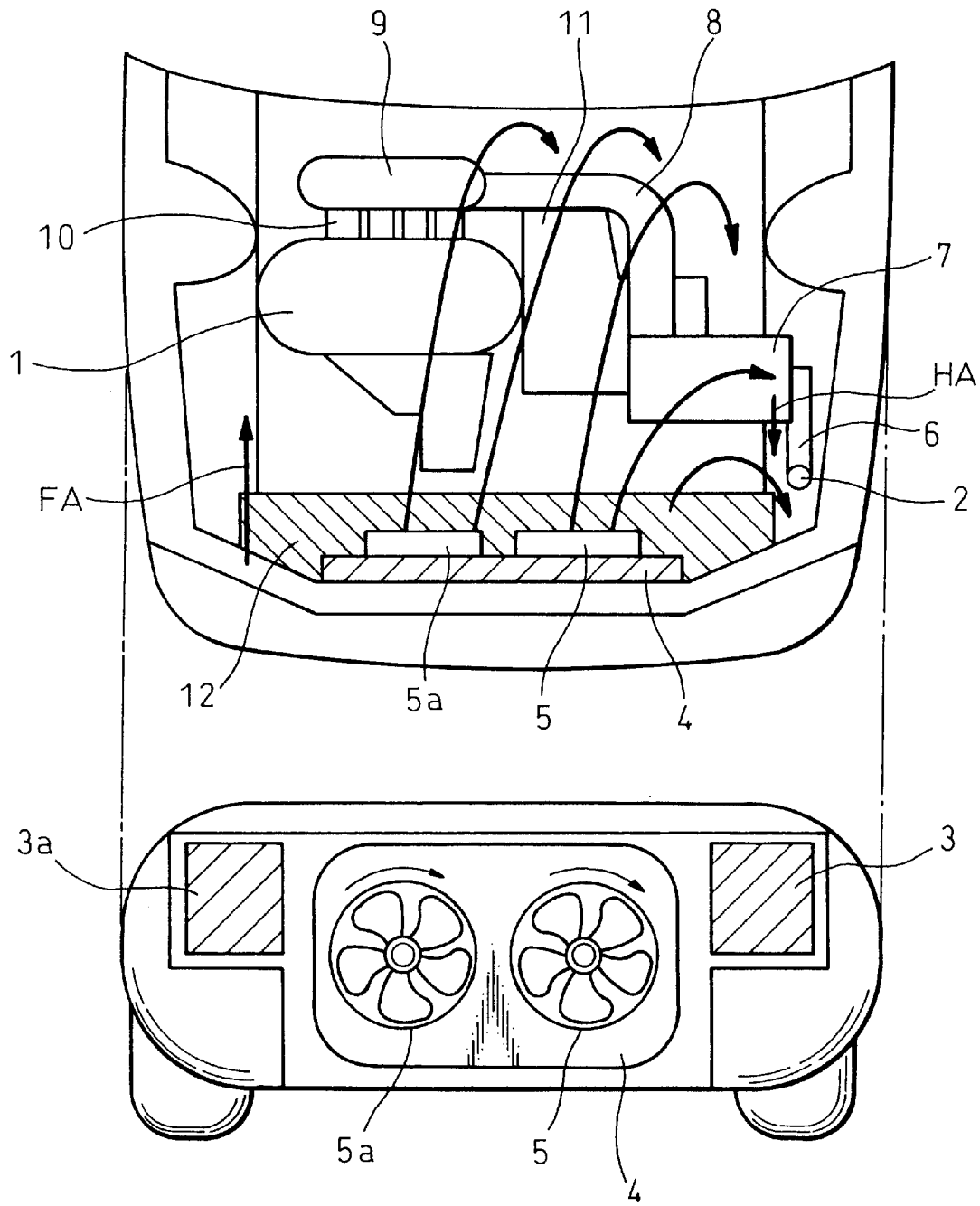
FIG. 12 is a schematic diagram showing a conventional engine compartment structure of a vehicle for introducing cool air into an intake air system of the engine.

First, the setting of the rotational directions, the number of revolutions per minute and the blade lengths of a pair of cooling fans 5 and 5*a* in engine compartments shown in FIGS. 1 and 6 to 11 corresponding to the first to seventh embodiments of the present invention and that of a conventional engine compartment as shown in FIG. 12 will be briefly explained below.

In a conventional structure for introducing cool air into an intake air system of the engine in an engine compartment as shown in FIG. 12, a pair of cooling fans 5 and 5*a* both rotate counterclockwise as seen from the engine side. The number of revolutions per minute N1 of the cooling fan 5 is equal to the number of revolutions per minute N2 of the cooling fan 5*a*. Blade length L1 of the cooling fan 5 is also equal to the blade length L2 of the cooling fan 5*a*.

According to a first embodiment of the present invention shown in FIG. 1, a cooling fan 5 located closer to the air intake port 2 rotates clockwise, while the other cooling fan 5*a* rotates counterclockwise as seen from engine side. The pair of cooling fans 5 and 5*a* are mounted on a rear side of a radiator 4 at substantially the same height. The number of revolutions per minute N1 of the cooling fan 5 is equal to the number of revolutions per minute N2 of the cooling fan 5*a*. Blade length L1 of the cooling fan 5 is also equal to the blade length L2 of the cooling fan 5*a*.

Figure 6:
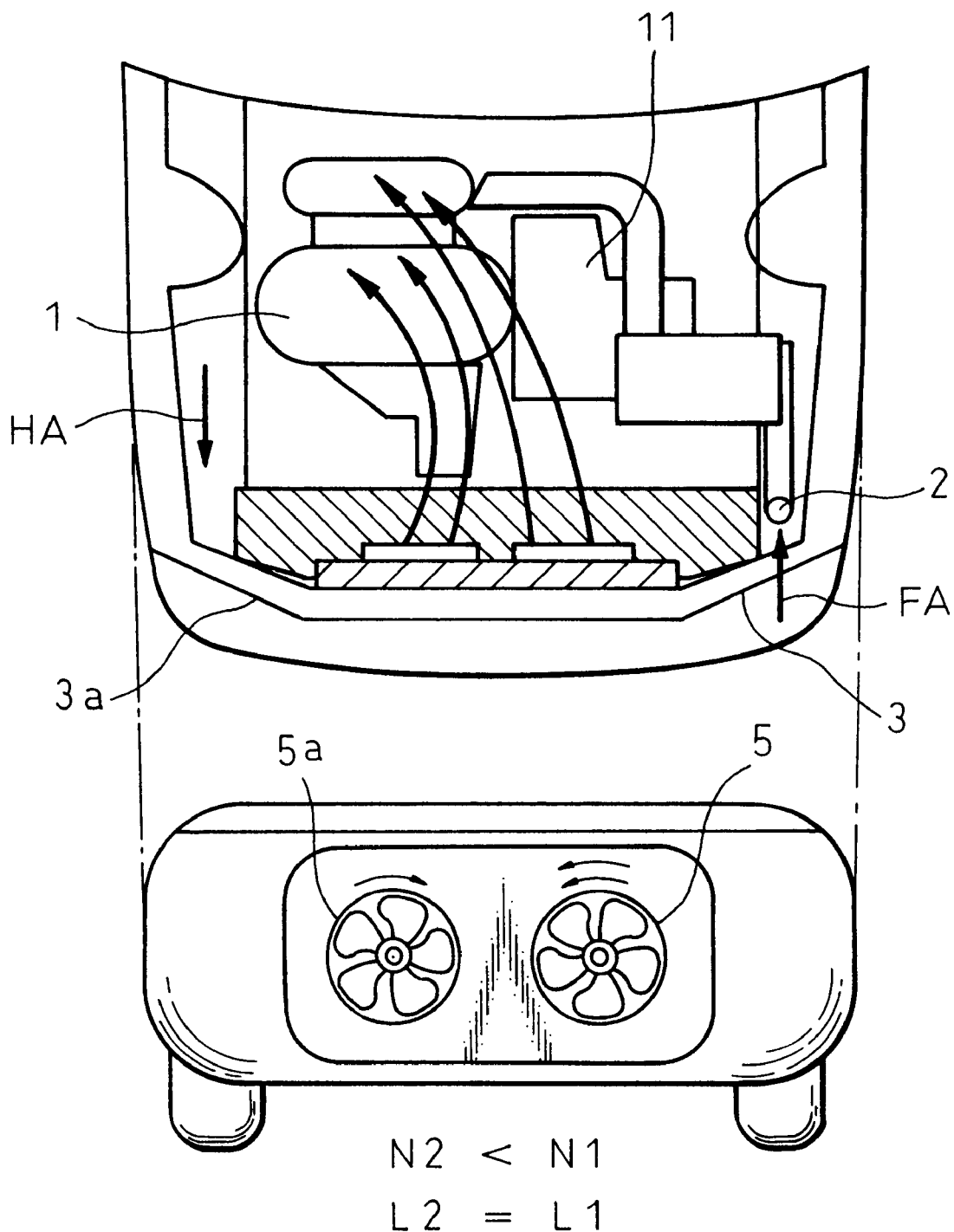
FIGS. 6 to 11 are schematic diagrams each showing an engine compartment structure of a vehicle for introducing cool air into an intake air system of the engine according to a second to a seventh embodiment of the present invention.

According to the second embodiment of the present invention shown in FIG. 6, a cooling fan 5 located closer to the air intake port 2 rotates clockwise, while the other cooling fan 5*a* rotates counterclockwise as seen from the engine side. The number of revolutions per minute N1 of the cooling fan 5 is larger than the number of revolutions per minute N2 of the cooling fan 5*a*. Blade length L1 of the cooling fan 5 is equal to the blade length L2 of the cooling fan 5*a*.

Figure 7:
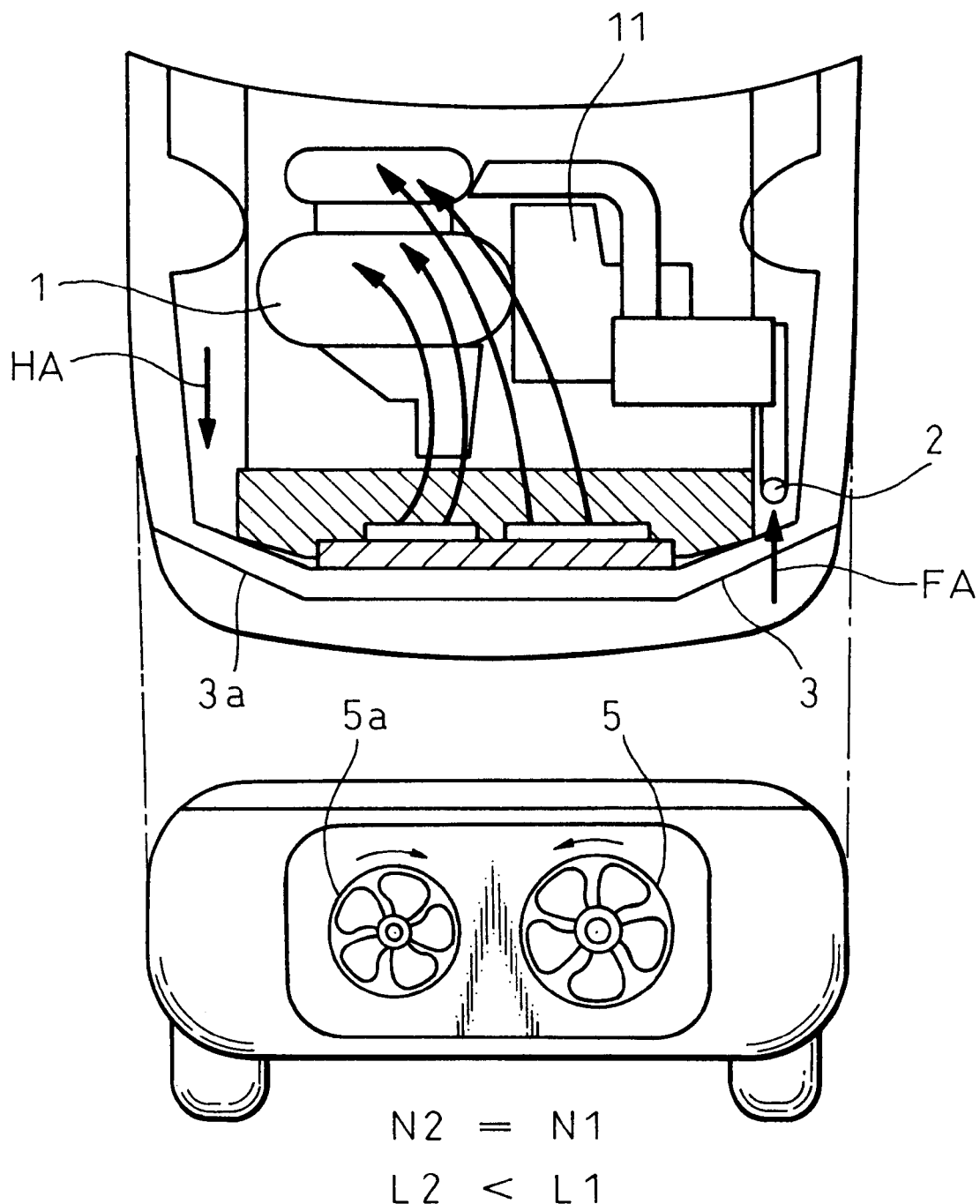

According to the third embodiment of the present invention shown in FIG. 7, a cooling fan 5 located closer to the air intake port 2 rotates clockwise, while the other cooling fan 5*a* rotates counterclockwise as seen from engine side. The number of revolutions per minute N1 of the cooling fan 5 is equal to the number of revolutions per minute N2 of the cooling fan 5*a*. However, blade length L1 of the cooling fan 5 is longer than the blade length L2 of the cooling fan 5*a*.

Figure 8:
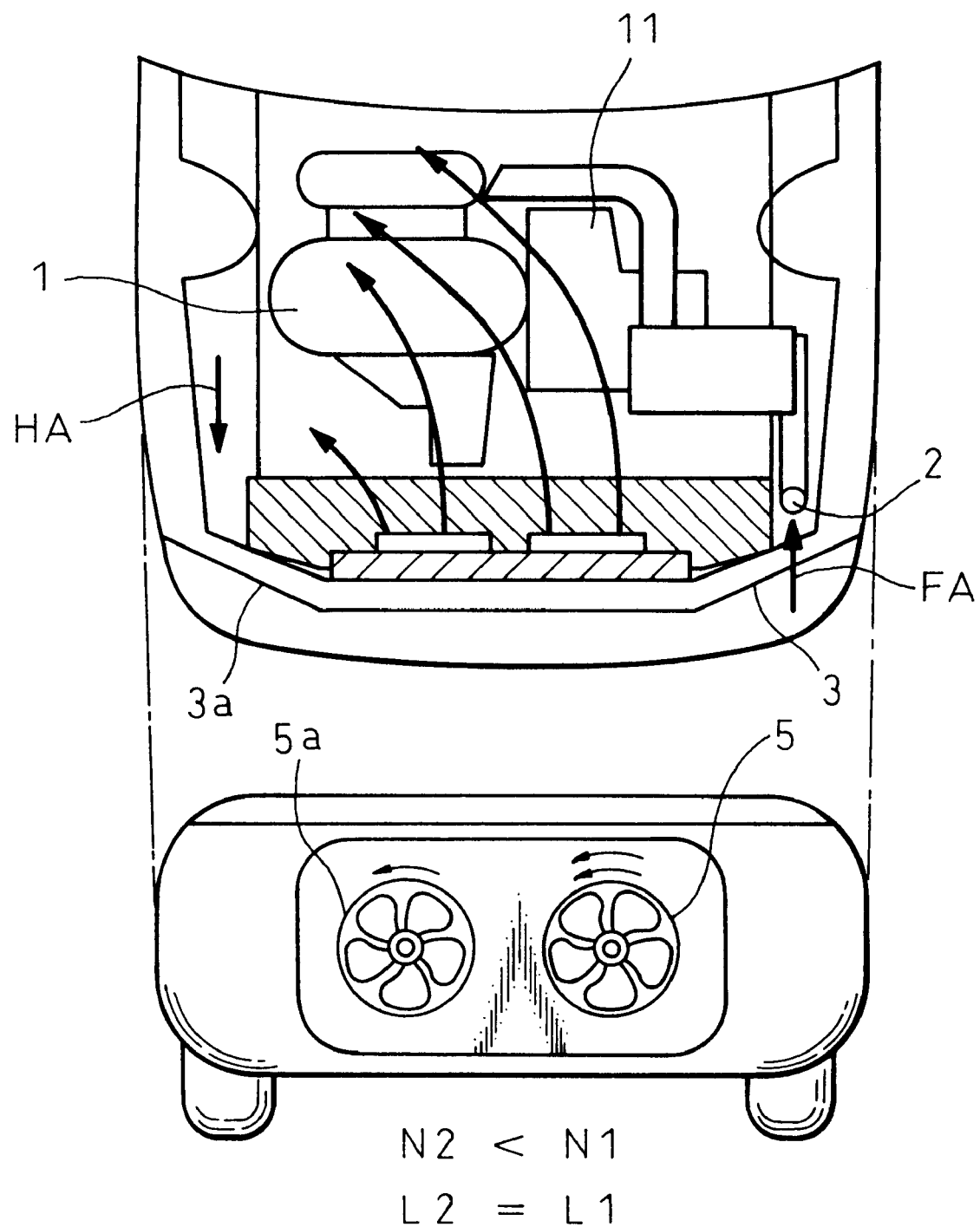

According to the fourth embodiment of the present invention shown in FIG. 8, a pair of cooling fans 5 and 5*a* mounted on a rear side of a radiator 4 at substantially the same height both rotate clockwise as seen from the engine side. The number of revolutions per minute N1 of the cooling fan 5 is larger than the number of revolutions per minute N2 of the cooling fan 5*a*. Blade length L1 of the cooling fan 5 is equal to the blade length L2 of the cooling fan 5*a*.

Figure 9:
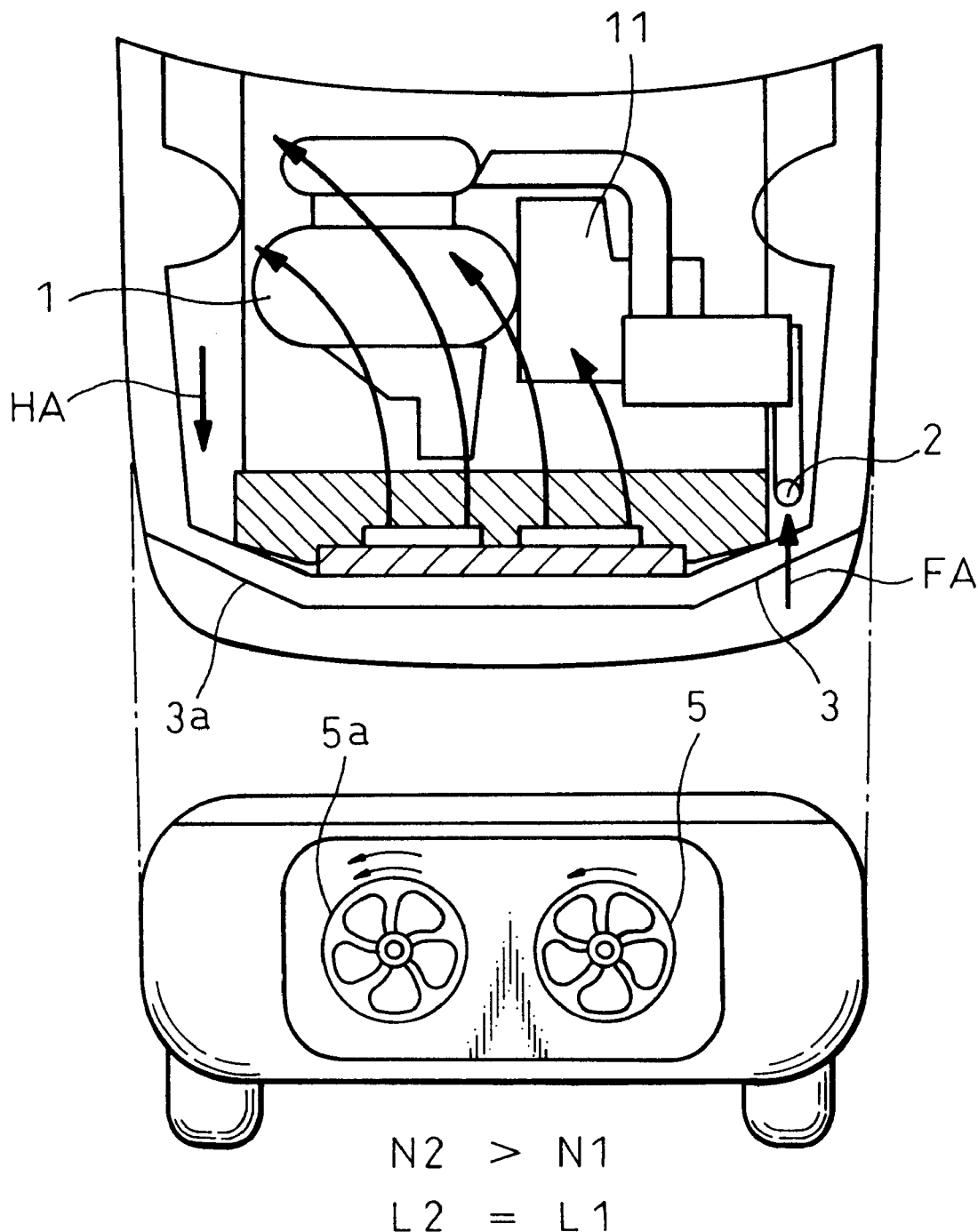

According to the fifth embodiment of the present invention shown in FIG. 9, a pair of cooling fans 5 and 5*a* mounted on a rear side of a radiator 4 at substantially the same height both rotate clockwise as seen from the engine side. The number of revolutions per minute N1 of the cooling fan 5 is smaller than the number of revolutions per minute N2 of the cooling fan 5*a*. Blade length L1 of the cooling fan 5 is equal to the blade length L2 of the cooling fan 5*a*.

Figure 10:
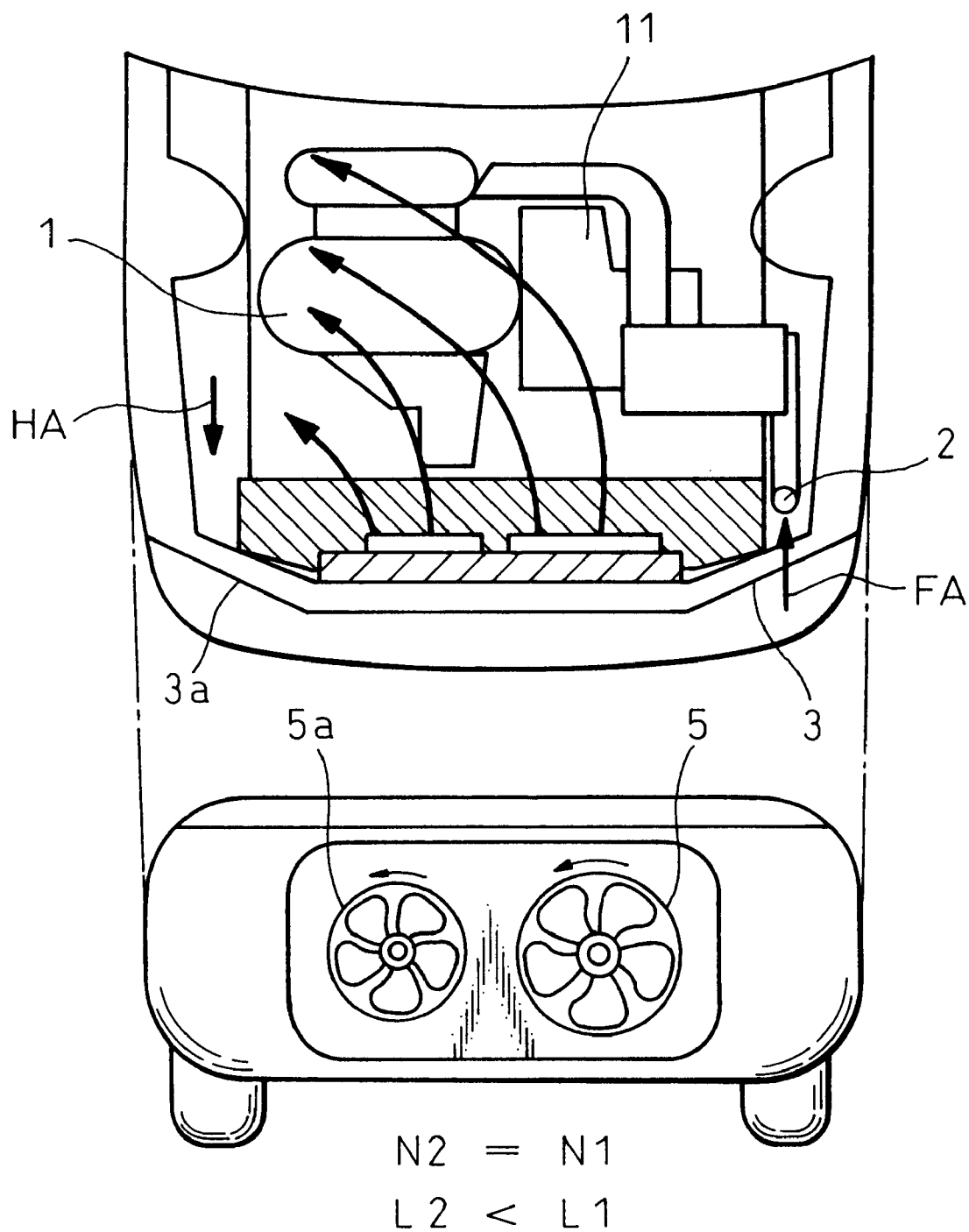

According to the sixth embodiment of the present invention shown in FIG. 10, a pair of cooling fans 5 and 5*a* mounted on a rear side of a radiator 4 at substantially the same height both rotate clockwise as seen from engine side. The number of revolution N1 of the cooling fan 5 is equal to the number of revolution N2 of the cooling fan 5*a*. Blade length L1 of the cooling fan 5 is longer than the blade length L2 of the cooling fan 5*a*.

According to the seventh embodiment of the present invention shown in FIG. 11, a pair of cooling fans 5 and 5*a* mounted on a rear side of a radiator 4 at substantially the same height both rotate clockwise as seen from engine side. The number of revolutions per minute N1 of the cooling fan 5 is equal to the number of revolutions per minute N2 of the cooling fan 5*a*. Blade length L1 of the cooling fan 5 is shorter than the blade length L2 of the cooling fan 5*a*.

Air passage in the upper space of the engine compartments shown in FIGS. 1 and 6 to 11 according to the first to seventh embodiments of the present invention and as shown in FIG. 12 according to a conventional engine compartment will now be briefly explained.

As can be seen by the arrows shown in FIG. 12 the heated air HA flowing through the cooling fans 5 and 5*a* is deflected toward the right when viewed from the front of the vehicle. A strong influence of the rotational component of the flow velocity behind the fan blades of the cooling fans 5 and 5*a*, forces the air to pass through the space over the transmission 11. Part of the air passes through the gap between the engine block 1 and the bonnet of the vehicle, which is not shown in FIG. 12. The air is warmed up by the heat of the engine block 1, and the heated air HA turns around toward the intake air port 2 which is located behind the headlamp 3. Fresh air FA comes into the space behind the headlamp 3a in the engine compartment.

As can be seen by the arrows shown in FIG. 1 according to the first embodiment of the present invention, the heated air HA flowing through the cooling fans 5 and 5a flows comparatively straight, unlike in conventional engine compartments. This is because the rotational directions of the cooling fans 5 and 5a are opposite each other so that the rotational component of the flow velocity behind the fan blades of the cooling fans 5 and 5a are offset by each other. Thus, the heated air HA flows comparatively straight without being deflected toward either right or left when viewed from the front of the vehicle. Accordingly, the heated air HA does not flow into the air intake port 2. Most of the air passes through the space over the transmission 11 and part of the air passes through the gap between the engine block 1 and the bonnet of the vehicle, which is not shown in FIG. 1. The air is warmed up by the heat of the engine block 1, and the heated air HA does not turn around into the intake air port 2 which is located behind the headlamp 3. Furthermore, the fresh air FA comes into the space behind the headlamp 3 in the engine compartment.

Air passage in the upper space of the engine compartments shown in FIGS. 6 to 11 according to the second to seventh embodiments of the present invention, is opposite to that of the conventional art as shown in FIG. 12. That is, as can be seen by the arrows shown in FIGS. 6 to 11, the heated air HA flowing through the cooling fans 5 and 5a is deflected toward the left when viewed from the front of the vehicle, with the strong influence of the rotational component of the flow velocity behind the fan blades of the cooling fans 5 and 5a. Most of the air passes through the space over the transmission 11 and part of the air passes through the gap between the engine block 1 and the bonnet of the vehicle, which is not shown in FIGS. 6 to 11. The air is warmed up by the heat of the engine block 1, and the heated air HA turns around toward the space behind the headlamp 3a. Fresh air FA comes into the space behind the headlamp 3 in the engine compartment.

Regarding the second and the third embodiments shown in FIGS. 6 and 7, the rotational directions of the pair of the cooling fans 5 and 5a are the same as in the case of the first embodiment shown in FIG. 1. The blade length L1 of the cooling fan 5 is the same as the blade length L2 of the cooling fan 5a (L1=L2). However, in the second embodiment, the rotational speed N1 of the cooling fan 5 is larger than the rotational speed N2 of the cooling fan 5a (N1>N2). In the third embodiment, the blade length L1 of the cooling fan 5 is longer than the blade length L2 of the cooling fan 5a but the rotational speed N1 of the cooling fan 5 is same as the rotational speed N2 of the cooling fan 5a (N1=N2). Therefore, the effect of the rotational component of the flow velocity behind the fan blade of the cooling fan 5 becomes stronger than the fan blade of the cooling fan 5a. Thus, the air volume discharged by the cooling fan 5 become larger than the air volume discharged by the cooling fan 5a. As a result, the back wind of the cooling fans 5 and 5a as a whole is deflected toward the left of the engine compartment when viewed from the front of the vehicle.

Regarding the fourth to the seventh embodiments shown in FIGS. 8 to 11, the rotational directions of each of the cooling fans 5 and 5a is clockwise as seen from the engine side, which is opposite to the conventional art shown in FIG. 12. Therefore, the back wind of the cooling fans 5 and 5a is deflected toward the left of the engine compartment when viewed from the front of the vehicle. In addition, regarding the fourth embodiment, the blade length L1 of the cooling fan 5 is the same as the blade length L2 of the cooling fan 5a (L1=L2), but the number of revolutions per minute N1 of the cooling fan 5 is larger than the number of revolutions per minute N2 of the cooling fan 5a (N1>N2). Therefore, the effect of the rotational component of the flow velocity behind the fan blade of the cooling fan 5 becomes stronger than the flow velocity of cooling fan 5a. Thus, the air volume discharged by the cooling fan 5 becomes larger than the air volume discharged by the cooling fan 5a. As a result, the back wind of the cooling fans 5 and 5a as a whole is deflected toward the left of the engine compartment when viewed from the front of the vehicle.

Regarding the fifth embodiment, the blade length L1 of the cooling fan 5 is the same as the blade length L2 of the cooling fan 5a (L1=L2) but the number of revolutions per minute N1 of the cooling fan 5 is smaller than the number of revolutions per minute N2 of the cooling fan 5a (N1<N2). Therefore, the effect of the rotational component of the flow velocity behind the fan blades of the cooling fan 5 becomes weaker than that behind the fan blades of the cooling fan 5a. Thus, the air volume discharged by the cooling fan 5 becomes smaller than the air volume discharged by the cooling fan 5a. As a result, the back wind of the cooling fan 5 follows the back wind of the cooling fan 5a, so that the back wind of the cooling fans 5 and 5a as a whole is deflected toward the left of the engine compartment when viewed from the front of the vehicle.

Regarding the sixth embodiment, the number of revolutions per minute N1 of the cooling fan 5 is the same as the number of revolutions per minute N2 of the cooling fan 5a (N1=N2), but the blade length L1 of the cooling fan 5 is longer than the blade length L2 of the cooling fan 5a (L1>L2). Therefore, the effect of the rotational component of the flow velocity behind the fan blade of the cooling fan 5 is stronger than the flow velocity of the cooling fan 5a. Thus, the air volume discharged by the cooling fan 5 is larger than the air volume discharged by the cooling fan 5a. As a result, the back wind of the cooling fans 5 and 5a as a whole is deflected toward the left of the engine compartment when viewed from the front of the vehicle.

Regarding the seventh embodiment, the number of revolutions per minute N1 of the cooling fan 5 is the same as the number of revolutions per minute N2 of the co cooling fan 5a (N1=N2), but the blade length L1 of the cooling fan 5 is shorter than the blade length L2 of the cooling fan 5a (L1<L2). Therefore, the effect of the rotational component of the flow velocity behind the fan blade 5 is weaker than the flow velocity of the cooling fan 5a. Thus, the air volume discharged by the cooling fan 5 is smaller than the air volume discharged by the cooling fan 5a. However, the back wind of the cooling fan 5 follows the back wind of the cooling fan 5a, so that the back wind of the cooling fans 5 and 5a as a whole is deflected toward the left of the engine compartment when viewed from the front of the vehicle.

As explained above, according to the present invention, by making the air volume discharged by the cooling fan 5 different from the air volume discharged by the cooling fan 5a, interference between each back wind of the cooling fans 5 and 5a can be reduced as compared with the case that each air volume discharged by each of the cooling fans 5 and 5a is equal, and the back wind of the cooling fans 5 and 5a as a whole can be deflected toward the left of the engine compartment when viewed from the front of the vehicle.

In order to verify the results of the computer simulation explained above referring to FIGS. 1, 6 to 11 and 12, experiments in the same engine compartment using smoke or taffeta (which is thin, shiny, rather stiff silk material) to verify the flow of the back wind of the fan blades with naked eyes were carried out. The same results were obtained. Furthermore, the atmospheric temperature at different locations in the engine compartments according to the engine compartment as shown in FIGS. 1, 6 to 11 and 12 were measured. As a result of the experiment, the temperature around the air intake port 2 shown in FIGS. 1, 6 to 11 was found to be much lower than that in FIG. 12, particularly when the engine is operated at low speed. Therefore, the atmospheric temperature around the air intake port 2 according to the present invention as shown in FIGS. 1, 6 to 11 is lower than that of the conventional art as shown in FIG. 12 when the vehicle speed is low. This indicates that the air filling efficiency to the chambers according to the present invention is improved as compared with the conventional art.

According to the present invention, no baffle plate is required. The objects of the invention are achieved by selecting; the rotational direction of each of the cooling fans mounted at substantially the same height on the rear side of the radiator, the air volume discharged by each of the cooling fans and the respective number of revolutions per minute and blade length of the cooling fans. Accordingly, the heated air flowing through the cooling fans for the radiator is not introduced into the air intake port, thereby decreasing the temperature of the intake air when the vehicle is idling or operating at low speed, improving the air filling efficiency to the chambers, and avoiding the additional cost and assembly man hours of a baffle plate.

It will be understood by those skilled in the art that the foregoing description are preferred embodiments of the disclosed device and that various changes and modifications may be made in the invention without departing from the spirit and scope thereof.

We claim:

1. An engine compartment construction, comprising:
   an engine compartment;
   a radiator located in the engine compartment;
   an air intake port located at a front corner of the engine compartment;
   a first cooling fan mounted at a rear side of the radiator, said first cooling fan having a configuration such that air discharged by the first cooling fan is directed away from the air intake port; and
   a second cooling fan mounted at the rear side of the radiator and located farther from the air intake port than the first cooling fan; wherein
   the first cooling fan is configured such that air volume discharged by the first cooling fan is larger than air volume discharged by the second cooling fan.

2. An engine compartment construction as claimed in claim 1, wherein each of the first cooling fan and the second cooling fan comprises a plurality of blades, and the blades of the first cooling fan are larger than the blades of the second cooling fan.

3. An engine compartment construction as claimed in claim 1, wherein an absolute value of the rotational speed of the first cooling fan is greater than that of the second cooling fan.

4. An engine compartment construction as claimed in claim 1, wherein each of the first cooling fan and the second cooling fan comprises a plurality of blades, and the blades of the first cooling fan are larger than the blades of the second cooling fan.

5. An engine compartment construction as claimed in claim 1, wherein an absolute value of the rotational speed of the first cooling fan is greater than that of the second cooling fan.

6. An engine compartment construction as claimed in claim 1, wherein the first cooling fan and the second cooling fan are rotatable in the same direction and a rotational speed of the first cooling fan is greater than that of the second cooling fan.

7. An engine compartment construction as claimed in claim 1, wherein the first cooling fan and the second cooling fan are rotatable in the same direction and a rotational speed of the first cooling fan is less than that of the second cooling fan.

8. An engine compartment construction as claimed in claim 1, wherein the first cooling fan and the second cooling fan are rotatable in the same direction and each of the first cooling fan and the second cooling fan comprises a plurality of blades, and the blades of the first cooling fan are larger than the blades of the second cooling fan.

9. An engine compartment construction as claimed in claim 1, wherein the first cooling fan and the second cooling fan are rotatable in the same direction and each of the first cooling fan and the second cooling fan comprises a plurality of blades, and the blades of the first cooling fan are smaller than the blades of the second cooling fan.

10. An engine compartment construction as claimed in claim 1, wherein said engine compartment has a longitudinal axis, said air intake port is located at a front air intake corner of the engine compartment, said first cooling fan has a configuration such that air discharged by said first cooling fan is directed away from said air intake port and at an oblique angle with respect to said engine compartment longitudinal axis, and said second cooling fan has a rotational direction that is opposite to a rotational direction of said first cooling fan.

11. A method for cooling an engine compartment, comprising:
    providing an air intake port at a front air intake corner on one side of a longitudinal axis of the engine compartment;
    providing a first cooling fan and a second cooling fan at a rear side of a radiator located in the engine compartment, wherein the first cooling fan is located closer to the air intake port than the second cooling fan;
    configuring the first cooling fan such that air discharged by the first cooling fan is directed away from the air intake port and at an oblique angle with respect to the longitudinal axis of the engine compartment, and such that air volume discharged by the first cooling fan is larger than air volume discharged by the second cooling fan.

12. A method for cooling an engine compartment as claimed in claim 11, further comprising rotating the second cooling fan in a direction opposite the rotational direction of the first cooling fan.

13. A method for cooling an engine compartment as claimed in claim 11, further comprising providing one of the first cooling fan and the second cooling fan with blades larger than blades of the other one of the first cooling fan and second cooling fan.

14. A method for cooling an engine compartment as claimed in claim 11, further comprising rotating one of the first cooling fan and the second cooling fan at a speed that has an absolute value that is greater than that of the other one of the first cooling fan and the second cooling fan.

* * * * *